July 24, 1962 W. L. MACKIE 3,045,958
SHOCK ABSORBING AIRCRAFT ARRESTING HOOK
Filed May 24, 1960

INVENTOR.
WILLIAM L. MACKIE
BY
*George J. Ruber*
ATTORNEY

3,045,958
SHOCK ABSORBING AIRCRAFT ARRESTING HOOK

William L. Mackie, Ventura, Calif., assignor to the United States of America as represented by the Secretary of the Navy
Filed May 24, 1960, Ser. No. 31,494
4 Claims. (Cl. 244—110)
(Granted under Title 35, U.S. Code (1952), sec. 266)

The invention described herein may be manufactured and used by or for the Government of the United States of America for govermental purposes without the payment of any royalties thereon or therefor.

This invention relates to aircraft arresting hooks, and, more particularly to such a hook having a cable-engaging surface capable of absorbing high-impact loads.

A conventional aircraft landing procedure on aircraft carriers, as well as secondary barriers on some air stations on land, is to retard the landing speed of an aircraft by use of one or more successive wire rope pendants that stretch across the landing area and engage a hook on the aircraft.

With the advent of heavy and high-speed jet-powered aircraft, the landing forces to which the arresting cables are subjected, have reached high values which cause premature failures of the arresting cables or cause damage to the arresting hooks and arresting cables. As an example of the impact involved, an F4D carrier-based aircraft weighing 18,700 pounds landing at a normal speed of 130 knots, and in a run-out of 1000 feet, presents an arresting force of 140,000 foot pounds. Faster and heavier aircraft have even a higher landing speed and present a still greater arresting force.

It has been observed that in high velocity impacts (i.e., up to 200 knots), breakage or serious damage occurs to the arresting gear, and primarily to the arresting cable, because of two basic causes. The principal cause of failure arises from the large shock load applied on the arresting cable at the initial impact between the hook and cable which sets up a transverse wave or kink in the cable that causes it to part. Other damage to the cable can be in the flattening or breaking of the strands. Another principal cause of damage to the cable arises from off-center arrestment that produces abrasion and galling by the reeving of the wire rope with the hook. The resulting temperatures from the abrasive action may exceed 1400° F. which temperature is sufficient to cause embrittlement of the wire rope.

The present invention minimizes the damage from impact, by providing the impacting surface of the hook with a tough, flexible plastic material that absorbs the impact shock, thus preventing damage to the hook and cable. The plastic material may be in the form of a glove which can be readily applied and replaced when damaged, or as a layer, or an insert bonded to the face of the hook.

A principal object of this invention is to provide a cable-engaging hook with a tough, flexible plastic material which will absorb high-velocity shock forces.

Another object is to provide such a covering in a construction which may be easily applied and removed from the supporting body.

Still a further object is to provide such a covering which will provide lubrication, thus lowering the temperature to which the arresting hook will be subjected, and thus prevent embrittlement and abrasion of the parts.

Other objects of many of the attendant advantages of this invention will be readily appreciated as the same become better understood by reference to the following detailed description when considered in connection with the accompanying drawings wherein.

Figure 1:
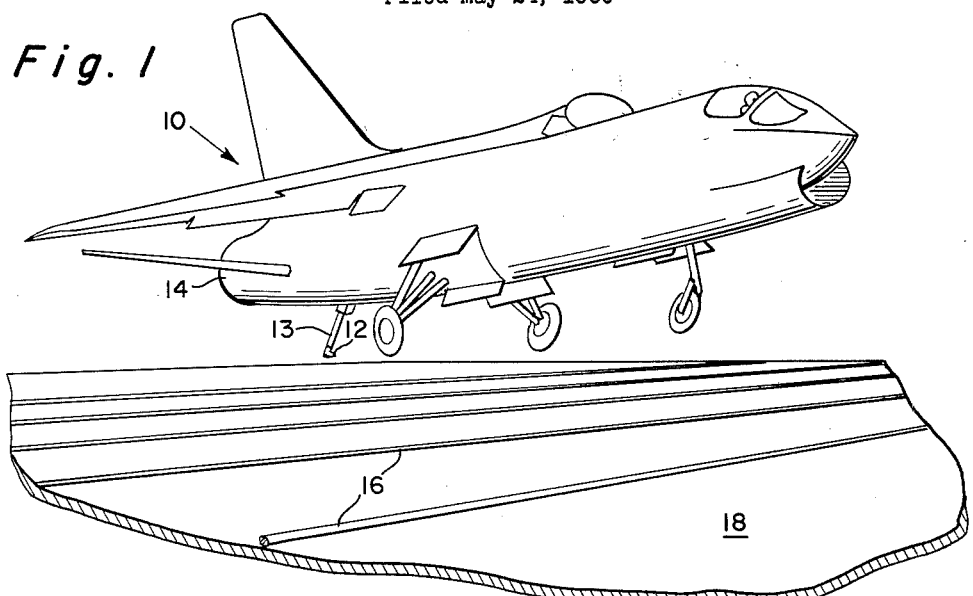
FIG. 1 is a diagrammatic view of carrier-based aircraft having an arresting hook making a cable-arresting landing on the deck of an aircraft carrier.

Referring to the drawing where like reference numerals refer to similar parts throughout the figures, FIG. 1 illustrates a typical landing operation of a carrier-based aircraft 10 having an arresting hook 12 appending by arm 13 from the aft end of fuselage 14. Hook 12 is adapted to engage one or more of a successive number of arresting cables 16 stretched transversely across the deck 18 of the carrier to bring the aircraft to a standstill.

The instant invention concerns the construction of arresting hook 12 that will absorb the terrific impact force arising when the hook engages arresting cables 16.

Figure 2:
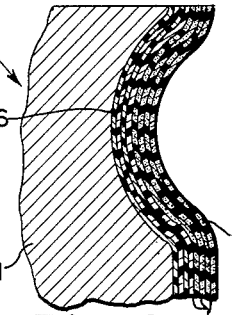
FIG. 2 is a sectional side elevation view of an arresting hook with a glove of shock-absorbing material.

One type of arresting hook according to this invention is shown in FIG. 2, wherein hook 12 has a metal body portion 20 provided with a longitudinally-drilled aperture 22 to receive vertical arm 13 for securing thereto in a conventional manner. In accordance with the teaching of this modification the entire body portion is covered by a plastic overlay material which may be in the form of a glove 24, that can be readily slipped over the hook and resiliently and/or adhesively secured thereto. The desirability of a glove-type construction is obvious since it offers a convenient and quick manner of replacing the material without the necessity of removing the hook from the aircraft or other special handling.

In order to be a good shock-absorbing material, the plastic material must withstand the high-impact load without damaging the arresting cable or the hook. To accomplish this result, the plastic material must be tough and flexible. It has been found in tests that several flexible plastic materials exhibit these characteristics; namely, polyvinyl chloride, polyurethane rubber, epoxy resin and fluorocarbon rubber. Coverings of any of these materials in the order of one-quarter inch thickness have proven to reduce the damage to the arresting cable to a negligible value. The extent of protection offered by the invention covering is largely determined by the number and velocity of the impacts. In landing speeds exceeding 120 knots, the plastic gloves are usually cut in the throat section 26, so it may be desirable during high-speed landings that the plastic overlay be replaced after several landings or each landing. Thus, it may be important that the overlay be expendable in the form of a glove to permit expeditious attachment to and removal from the hook.

Figures 3, 6:
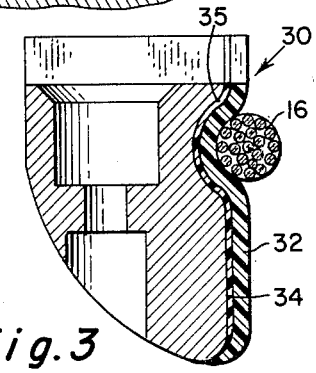
FIG. 3 is a similar view of an arresting hook having an overlay of absorbing material bonded to the face.
FIG. 6 is an enlarged partial section of a throat portion of an arresting hook made of a laminated shock-absorbing material.

In FIG. 3 arresting hook 30 has a plastic overlay in the form of a patch 32 that covers and is adhered to only the impacting face 34 of the hook as distinguished from the glove construction of FIG. 2. In this modification, patch 32 must be intimately bonded by an adhesive 35 or the like to the hook to avoid separation when subject to the high-impact load.

One suitable method for applying the patch plastic overlay consisted of the following steps:

(1) Dip the sandblasted and degreased hook in a suitable primer; i.e., zinc chromate, and air-dry for approximately thirty minutes.

(2) Heat hook forty-five minutes at 250° F.

(3) Immediately dip hook in the liquid plastic material; i.e., polyvinyl chloride, and cool to approximately 200° F.

(4) Reheat hook to 250° F. and dip a second time in the liquid plastic material.

(5) Oven-cure forty-five minutes at 350° F.

NOTE.—The double dip will deposit approximately one-fourth inch of the plastic material to the hook. Excess plastic on other surfaces of the hook which need not be protected can be cut and removed by a sharp instrument.

Figure 4:
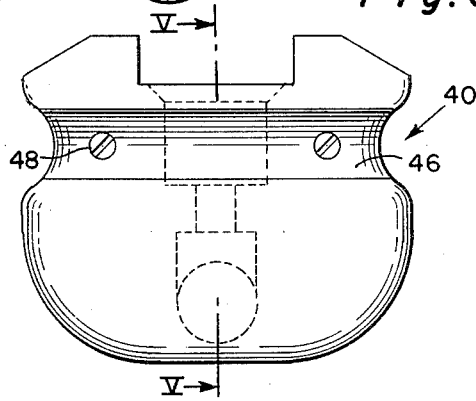
FIG. 4 is a front elevation view of an insert-type of absorbing material.
Figure 5:
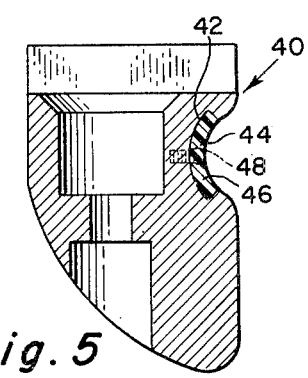
FIG. 5 is a cross section taken along line V—V of FIG. 4.

The modification illustrated in FIGS. 4 and 5 utilizes a mechanical attachment to supplement the adhesive bonding of the overlay to the arresting hook as shown in the modification of FIG. 3.

A hook 40 is provided with a transverse slot 42 at the throat section 44, being the area where the major shock load occurs, which slot accommodates a plastic insert 46. Insert 46 may be fabricated from a sheet of the plastic material; i.e., polyvinyl chloride of the desired thickness. In addition to the insert 46 being adhesively bonded in slot 42, it may be mechanically secured by means of screws 48 to increase the bond strength of the overlay and prevent failure when the hook is subject to high landing speeds (180 to 200 knots).

The arresting hook modifications illustrated in FIGS. 2 to 5 have proven in practice to absorb shock when engaging an arresting cable in high-speed landings and appreciably reduce the damaging effects on the cables and hooks. It has also been discovered in tests that the plastic overlay has a beneficial result in reducing abrasion in off-center engagements of the hook with the arresting cable that will otherwise cause galling by the relative lateral movement of the engaging members. It is believed that partial melting of the overlay during the reeving action provides a lubricating effect to reduce the temperature and gouging of the hook, as well as reducing embrittlement and work hardening of the wire cable.

A modified hook 60 of FIG. 6 is designed to provide additional lubrication over and above that lubrication which the plastic material employed in the overlay may inherently possess. Whereas the prior discussed hooks have one or more layers of the same flexible plastic material, the overlay portion 62 on hook body 61 is constructed of a laminate of vertical layers 64 of a plastic material; i.e., fiberglass cloth impregnated with epoxy resin and bonded together under high pressure to provide a strong shock-absorbing patch or cover. In one example, each laminae was about .015 inch thick, and overlay portion comprising about 20 of such laminae. A portion of the outermost laminae on the front face, and particularly at the throat section 66, is also impregnated with a conventional lubricant, such as 20% molybdenum disulfide to provide additional lubrication during any reeving action in any off-center landing to assist in reducing the deleterious high-temperature effects on the wire arresting cable. Whereas hook 60 is provided with a body 61 similar to the other hook modification, the body 61 could be fabricated entirely of the laminae material.

The application of overlays of a tough, flexible plastic material to aircraft arresting hooks provides means for reducing impact damage to wire arresting cables during landing operations using this method. The cushioning effect of the plastic overlay may reduce the work hardening effect on the wire rope and decrease brittleness. Since such overlays may last for only a few landing operations, especially at high-speed landing operations, the overlay may be in the form of a glove or the like which is readily removable and replaceable. In addition to protecting the arresting cable and hook from the high-impact forces, the plastic overlay may reduce the high-temperature effects of abrasion from off-center landings, and if desired, additional lubricating materials may be incorporated in the overlay material to further accomplish this purpose.

Obviously many modifications and variations of the present invention are possible in the light of the above teachings. It is therefore to be understood that within the scope of the appended claims the invention may be practiced otherwise than as specifically described.

I claim:

1. An aircraft arresting hook for engagement with an arresting cable comprising a body having a throat portion on a face thereof adapted to receive said cable, at least a portion of said face being formed of a tough, flexible plastic material having high impact strength and high resistance to abrasion, said plastic material containing a lubricant.

2. An aircraft arresting hook for engagement with an arresting cable comprising a body having a throat portion on a face thereof adapted to receive said cable, at least a portion of said face being formed of a tough plastic material having high impact strength and high resistance to abrasion, said plastic material formed of laminae extending parallel to said face, and a portion of said laminae containing a lubricating material.

3. An aircraft arresting hook for engagement with an arresting cable comprising a body having a throat portion on a face thereof adapted to receive said cable at least a portion of said face being formed of polyvinyl chloride being a tough material having high impact strength and high resistance to abrasion.

4. An aircraft arresting hook for engagement with an arresting cable comprising a body having a throat portion on a face thereof adapted to receive said cable at least a portion of said face being formed of polyurethane rubber being a tough material having high impact strength and high resistance to abrasion.

References Cited in the file of this patent

UNITED STATES PATENTS

| | | |
|---|---|---|
| 1,748,100 | Avery | Feb. 25, 1930 |
| 1,836,576 | Chalmers | Dec. 15, 1931 |
| 2,357,054 | Muddiman | Aug. 29, 1944 |
| 2,370,406 | King | Feb. 27, 1945 |
| 2,602,613 | Turner | July 8, 1952 |
| 2,680,273 | Brickman | June 8, 1954 |
| 2,715,617 | White | Aug. 16, 1955 |
| 2,734,785 | Toulmin | Feb. 14, 1956 |
| 2,979,292 | Cruger | Apr. 11, 1961 |